US010239425B2

(12) United States Patent
Bryant

(10) Patent No.: US 10,239,425 B2
(45) Date of Patent: Mar. 26, 2019

(54) MOVABLE PARTITION SYSTEM FOR A VEHICLE WITH STOWABLE JUMPSEAT

(71) Applicant: GM GLOBAL TECHNOLOGY OPERATIONS LLC, Detroit, MI (US)

(72) Inventor: Wade W. Bryant, Grosse Pointe Farms, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 43 days.

(21) Appl. No.: 15/624,918

(22) Filed: Jun. 16, 2017

(65) Prior Publication Data

US 2018/0361880 A1 Dec. 20, 2018

(51) Int. Cl.
*B60N 2/30* (2006.01)
*B60R 21/02* (2006.01)
*B60N 2/01* (2006.01)
*B60N 2/06* (2006.01)

(52) U.S. Cl.
CPC .............. *B60N 2/30* (2013.01); *B60N 2/012* (2013.01); *B60N 2/062* (2013.01); *B60R 21/026* (2013.01)

(58) Field of Classification Search
CPC .......... B60N 2/005; B60N 2/012; B60N 2/04; B60N 2/062; B60N 2/14; B60N 2/30; B60N 2/3004; B60N 2/304; B60N 2/3047; B60R 21/026

USPC .................... 296/24.4, 65.01, 65.11
See application file for complete search history.

(56) References Cited

U.S. PATENT DOCUMENTS

| | | | | | |
|---|---|---|---|---|---|
| 2,235,751 | A | * | 3/1941 | Sears | B60N 2/3047 296/65.01 |
| 2003/0141731 | A1 | * | 7/2003 | Betts | B60N 2/3013 296/24.43 |
| 2018/0057169 | A1 | * | 3/2018 | Phi | B64D 11/0696 |
| 2018/0126874 | A1 | * | 5/2018 | Kanemori | B61D 1/04 |

FOREIGN PATENT DOCUMENTS

| | | | | | |
|---|---|---|---|---|---|
| FR | 2645810 | A1 | * | 10/1990 | B60N 2/062 |
| FR | 2725669 | A1 | * | 4/1996 | B60N 2/3022 |
| FR | 2845954 | A1 | * | 4/2004 | B60N 2/3031 |
| FR | 2876637 | A1 | * | 4/2006 | B60N 2/3031 |
| FR | 2933347 | A1 | * | 1/2010 | B60N 2/3015 |

* cited by examiner

*Primary Examiner* — Jason S Daniels
(74) *Attorney, Agent, or Firm* — Lorenz & Kopf, LLP

(57) ABSTRACT

A movable partition system for a vehicle is provided. The movable partition system includes a body configured to be movably coupled to a cabin of the vehicle. The body is movable between at least a first position and a second position. The movable partition system includes a jumpseat coupled to the body so as to be pivotal about a first pivot axis and a second pivot axis. The jumpseat is pivotable about the first pivot axis and the second pivot axis to move between a first, stowed position and a second, use position. The first pivot axis is offset from the second pivot axis along a longitudinal axis of the jumpseat.

18 Claims, 12 Drawing Sheets

MOVABLE PARTITION SYSTEM FOR A VEHICLE WITH STOWABLE JUMPSEAT

TECHNICAL FIELD

The present disclosure generally relates to vehicles, and more particularly relates to a movable partition system for a vehicle with a stowable jumpseat.

INTRODUCTION

Certain vehicles, such as motor vehicles, include a cargo area for holding goods and other cargo. For example, a delivery vehicle, such as a delivery van may include an enlarged cargo area, which enables an operator to walk within the cargo area of the vehicle and retrieve goods for delivery. In the example of a delivery vehicle, it certain instances it is desirable to enclose the cargo area, to ensure the cargo is retained within the cargo area while operating the vehicle, for example. The enclosure, however, may impede delivery time efficiency.

In other instances, in the example of a delivery vehicle, an operator may desire to have an additional passenger seat. For example, during peak delivery season, it may be desirable to have a second occupant to assist in the delivery of goods. The additional passenger seat, however, may impede access to the enlarged cargo area.

Accordingly, it is desirable to provide a movable partition system for a vehicle with a stowable jumpseat, which enables quick access to an enlarged cargo area and provides an additional passenger seat. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, provided is a movable partition system for a vehicle. The movable partition system includes a body configured to be movably coupled to a cabin of the vehicle. The body is movable between at least a first position and a second position. The movable partition system includes a jumpseat coupled to the body so as to be pivotal about a first pivot axis and a second pivot axis. The jumpseat is pivotable about the first pivot axis and the second pivot axis to move between a first, stowed position and a second, use position. The first pivot axis is offset from the second pivot axis along a longitudinal axis of the jumpseat.

The jumpseat includes a seat bottom and a seat back, and the first pivot axis is defined by at least one pivot pin coupled to the seat bottom. The second pivot axis is defined by at least one pivot pin coupled to the seat back. The seat bottom includes a guide slot, and the seat back includes a follower tab received within the guide slot to pivot the seat back as the seat bottom moves along the first pivot axis. At least one of the seat bottom and the seat back include at least one bolster. The body includes an occupant restraint system coupled to the body adjacent to the jumpseat. The body includes a latch body and the vehicle includes a jamb strike that receives the latch body to secure the body to the vehicle in the second position. The jumpseat includes a lock system having a lock pin that retains the jumpseat in the first, stowed position. The movable partition system includes a source of data that indicates whether the body is secured to the vehicle in the second position, and a controller. The controller processes the data, determines that the body is secured to the vehicle in the second position and outputs one or more control signals to the lock system to release the lock pin based on the determination.

Also provided is a movable partition system for a vehicle. The movable partition system includes a body configured to be movably coupled to a cabin of the vehicle. The body is movable between at least a first position and a second position. The movable partition system includes a jumpseat coupled to the body so as to be pivotal about a first pivot axis and a second pivot axis. The jumpseat has a seat bottom interconnected to a seat back. The first pivot axis is defined by at least one pivot pin coupled to the seat bottom and the second pivot axis is defined by at least one pivot pin coupled to the seat back. The jumpseat is pivotable about the first pivot axis and the second pivot axis to move between a first, stowed position and a second, use position. The first pivot axis is offset from the second pivot axis along a longitudinal axis of the jumpseat.

The seat bottom includes a guide slot, and the seat back includes a follower tab received within the guide slot to pivot the seat back as the seat bottom moves along the first pivot axis. At least one of the seat bottom and the seat back include at least one bolster. The body includes an occupant restraint system coupled to the body adjacent to the jumpseat. The body includes a latch body and the vehicle includes a jamb strike that receives the latch body to secure the body to the vehicle in the second position. The jumpseat includes a lock system having a lock pin that retains the jumpseat in the first, stowed position. The movable partition system includes a source of data that indicates whether the body is secured to the vehicle in the second position, and a controller. The controller processes the data, determines that the body is secured to the vehicle in the second position and outputs one or more control signals to the lock system to release the lock pin based on the determination.

Further provided is a vehicle. The vehicle includes a first partition fixedly coupled to a cabin of the vehicle. The vehicle also includes a first occupant seat disposed in front of the first partition such that a space is defined between the first occupant seat and the first partition. The vehicle includes a second partition movably coupled to the cabin of the vehicle. The second partition has a body movable between at least a first position and a second position. The vehicle includes a jumpseat coupled to the body so as to be pivotal about a first pivot axis and a second pivot axis. The jumpseat is pivotable about the first pivot axis and the second pivot axis to move between a first, stowed position and a second, use position. The first pivot axis is offset from the second pivot axis along a longitudinal axis of the jumpseat. In the first, stowed position, the second partition and the jumpseat are positionable within the space.

The jumpseat includes a seat bottom and a seat back, and the first pivot axis is defined by at least one pivot pin coupled to the seat bottom. The second pivot axis is defined by at least one pivot pin coupled to the seat back. The seat bottom includes a guide slot, and the seat back includes a follower tab received within the guide slot to pivot the seat back as the seat bottom moves along the first pivot axis. The body includes a latch body and the vehicle includes a jamb strike that receives the latch body to secure the body to the vehicle in the second position. The jumpseat includes a lock system having a lock pin that retains the jumpseat in the first, stowed position. The vehicle includes a source of data that indicates whether the body is secured to the vehicle in the second position, and a controller. The controller processes the data, determines that the body is secured to the vehicle in the second position and outputs one or more control signals to the lock system to release the lock pin based on the determination.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the vehicle systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
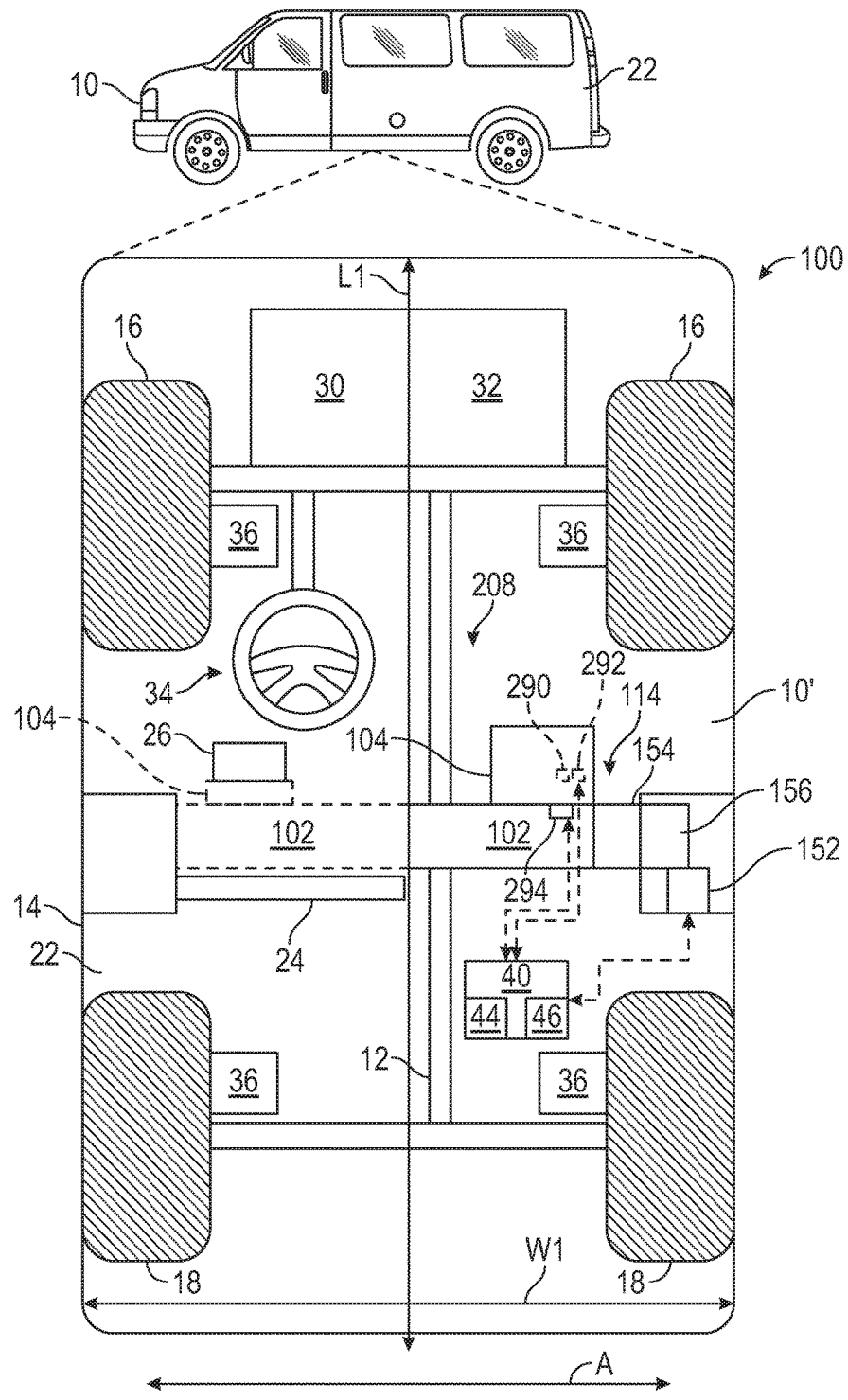
FIG. 1 is a functional block diagram illustrating a vehicle having a movable partition system, which includes a stowable jumpseat, in accordance with various embodiments.

With reference to FIG. 1, a movable partition system shown generally at 100 is associated with a vehicle 10 in accordance with various embodiments. In general, the movable partition system 100 includes a movable partition 102 and a stowable jumpseat 104 that provides an additional passenger seat for an occupant of the vehicle 10. As will be discussed, the movable partition 102 is movable to a first position within a cabin 10' of the vehicle 10 to provide access to a cargo area 22, and is movable to a second position within the cabin 10' of the vehicle 10 to enclose the cargo area 22. With the movable partition 102 in the first position, the jumpseat 104 is in a first, stowed position. With the movable partition 102 in the second position, the jumpseat 104 is capable of being moved to a second, use position. Although the figures shown herein depict an example with certain arrangements of elements, additional intervening elements, devices, features, or components may be present in an actual embodiment. It should also be understood that FIG. 1 is merely illustrative and may not be drawn to scale.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the vehicle 10 includes a fixed partition 24 and the movable partition 102, which is movable relative to the fixed partition 24 to gain access to the cargo area 22. Generally, the fixed partition 24 is fixedly coupled to the body 14 of the vehicle 10, and in this example, is fixedly coupled to the body 14 so as to be disposed behind a driver's seat 26 of the vehicle 10. In this example, the fixed partition 24 is illustrated as extending for substantially half a width W1 of the vehicle 10; however, the fixed partition 24 may only extend for a third of the width W1, as desired. As will be discussed further herein, the movable partition 102 is movable relative to the fixed partition 24 to the first position, which is between the fixed partition 24 and the driver's seat 26, and the second position (shown in phantom in FIG. 1), in which the movable partition 102 cooperates with the fixed partition 24 to enclose the cargo area 22. Generally, the movable partition 102 is movable along an axis A, which is substantially perpendicular to a longitudinal axis L1 of the vehicle 10. With the movable partition 102 in the first position, the jumpseat 104 is in the first, stowed position between the driver's seat 26 and the fixed partition 24 (shown in phantom in FIG. 1). With the movable partition 102 in the second position, the jumpseat 104 is movable to the second, use position, in which an occupant of the vehicle 10 may be seated within the jumpseat 104. The vehicle 10 is depicted in the illustrated embodiment as a cargo van, but it should be appreciated that any other vehicle including trucks, passenger cars, sport utility vehicle (SUV), recreational vehicles (RVs), marine vessels, aircraft, etc., can also be used.

As shown, the vehicle 10 generally includes a propulsion system 30, a transmission system 32, a steering system 34, a brake system 36 and a controller 40. The propulsion system 30 may, in various embodiments, include an internal combustion engine, an electric machine such as a traction motor, and/or a fuel cell propulsion system. The transmission system 32 is configured to transmit power from the propulsion system 30 to the wheels 16-18 according to selectable speed ratios. According to various embodiments, the transmission system 32 may include a step-ratio automatic transmission, a continuously-variable transmission, or other appropriate transmission. The brake system 36 is configured to provide braking torque to the wheels 16-18 and/or the transmission system 32. The brake system 36 may, in various embodiments, include friction brakes, brake by wire, a regenerative braking system such as an electric machine, and/or other appropriate braking systems. The steering system 34 influences the course of travel by the vehicle 10, for example by adjusting a position of the wheels 16-18.

The controller 40 includes at least one processor 44 and a computer readable storage device or media 46. The processor 44 can be any custom made or commercially available processor, a central processing unit (CPU), a graphics processing unit (GPU), an auxiliary processor among several processors associated with the controller 40, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 40 in controlling various components of the vehicle 10.

The instructions may include one or more separate programs, each of which comprises an ordered listing of executable instructions for implementing logical functions. The instructions, when executed by the processor 44, perform logic, calculations, methods and/or algorithms for controlling the components of the vehicle 10, and generate control signals to the various components of the vehicle 10 based on the logic, calculations, methods, and/or algorithms. Although only one controller 40 is shown in FIG. 1, embodiments of the vehicle 10 can include any number of controllers 40 that communicate over any suitable communication medium or a combination of communication mediums and that cooperate to process sensor signals, perform logic, calculations, methods, and/or algorithms, and generate control signals to control features of the vehicle 10.

In various embodiments, one or more instructions of the controller 40 are associated with the movable partition system 100 and, when executed by the processor 44, the instructions receive and process signals to output one or more control signals to the movable partition system 100. In one example, the instructions of the controller 40, when executed by the processor 44, process sensor signals from a latch sensor 152 of the movable partition system 100 and determine whether to output one or more control signals to a solenoid 292 to retract a lock pin 290. For example, the instructions of the controller 40, when executed by the processor 44, may process the sensor signals from the latch sensor 152, determine that the movable partition 102 is latched to the body 14 of the vehicle 10 and output the one or more control signals to the solenoid 292 to retract the lock pin 290 and enable the jumpseat 104 to be moved from the first, stowed position to the second, use position. As a further example, the instructions of the controller 40, when executed by the processor 44, may process the sensor signals from the latch sensor 152, determine that movable partition 102 is not latched to the body 14, and determine to not output the one or more control signals to the solenoid 292 as the movable partition 102 is not latched. In various embodiments, the instructions of the controller 40, when executed by the processor 44, process sensor signals from a seat position sensor 294 of the movable partition system 100 and determine whether to output one or more control signals to the solenoid 292 to extend the lock pin 290. For example, the instructions of the controller 40, when executed by the processor 44, may process the sensor signals from the seat position sensor 294, determine that the jumpseat 104 is in the first, stowed position and output the one or more control signals to the solenoid 292 to extend the lock pin 290 and retain the jumpseat 104 in the first, stowed position.

Figure 2:
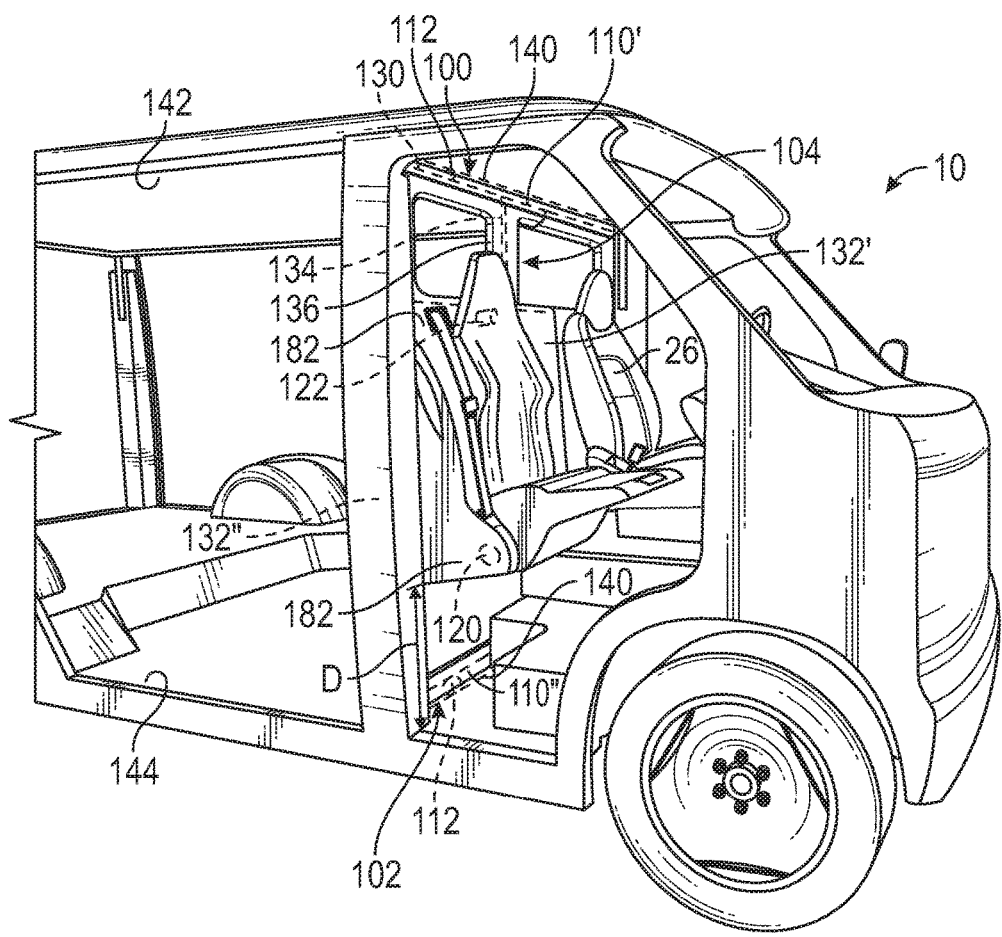
FIG. 2 is a perspective view of the vehicle of FIG. 1, in which a movable partition of the movable partition system is in a second position and the stowable jumpseat is in a second, use position.

Referring now to FIG. 2, the movable partition system 100 is shown in greater detail. In this example, the movable partition 102 is shown in the second position, which encloses the cargo area 22. The movable partition 102 is movable relative to the fixed partition 24 to the first position (FIG. 3) to enable access to the cargo area 22, the second position (FIG. 2) to enclose the cargo area 22, and various positions in-between. As will be discussed, the jumpseat 104 is coupled to the movable partition 102 and is movable between the first, stowed position (FIG. 3) and a second, use position (FIG. 2) based on a position of the movable partition 102. With brief reference to FIG. 3, in the first, stowed position, the movable partition 102 and the jumpseat 104 are positionable within a space S1 defined between the fixed partition 24 and the driver's seat 26. Stated another way, the space S1 is defined between the fixed partition 24 and the driver's seat 26 having a width W2. In the first, stowed position, the jumpseat 104 and the movable partition 102 have a width that is less than or substantially equal to the width W2 such that the jumpseat 104 and the movable partition 102 are positionable within the space S1. The jumpseat 104 may also remain in the first, stowed position when the movable partition 102 is in the second position (FIG. 4). Thus, the movable partition system 100 enables quick and convenient access to the cargo area 22, while also providing optional seating, such as for use by an additional occupant during a peak delivery season, training, etc.

Figure 10:
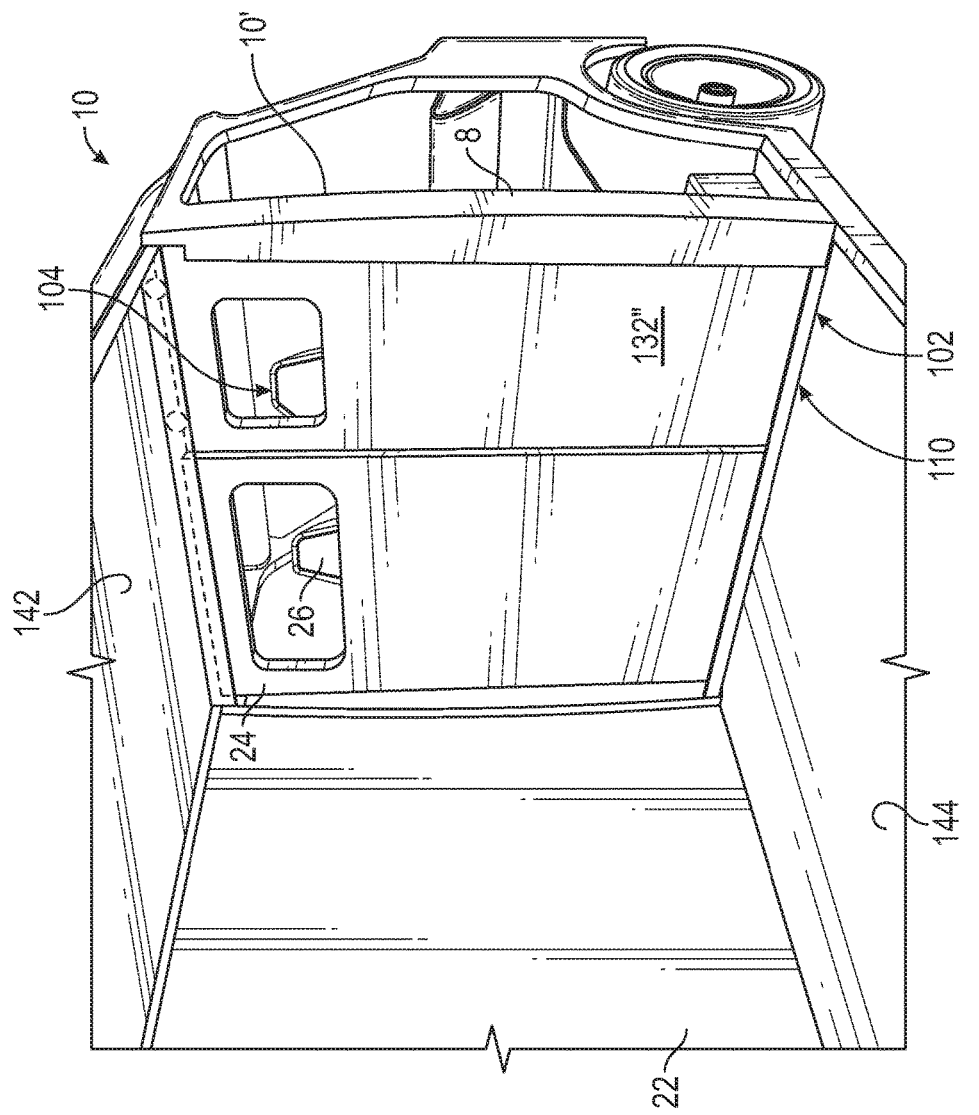
FIG. 10 is a rear perspective view of the vehicle of FIG. 2, which illustrates the access to the cargo area provided by the movable partition of the movable partition system in accordance with various embodiments.

In one example, the movable partition 102 includes a bulkhead body 110, one or more rollers 112, a latch system 114, a handle 116, an occupant restraint system 118, one or more first pivot bores 120 and at least one second pivot bore 122. In one example, the bulkhead body 110 includes a frame 130 and one or more panels 132. In this example, the frame 130 is composed of a metal or metal alloy, which is stamped, molded, cast, forged, etc. The frame 130 may be composed of multiple pieces, which are assembled via welding, mechanical fasteners, rivets, etc., to define the frame 130. In other embodiments, the frame 130 may be monolithic or one-piece. The frame 130 provides rigidity to the bulkhead body 110 during operation of the vehicle 10. In one example, the frame 130 is substantially rectangular, and includes at least one cut-out 134. The cut-out 134 may receive a window pane, or may be open to provide a pass-through from the cargo area 22, for example. In this example, the bulkhead body 110 includes a pair of panels 132; however, the bulkhead body 110 may include any number of panels 132. The panels 132 are each composed of a polymeric material, which is molded, extruded, laid-up via one or more plies, etc. The panel 132 is coupled to the frame 130, via one or more mechanical fasteners, overmolding, etc. In this example, one of the panels 132' is coupled to a first side of the frame 130 so as to be adjacent to the driver's seat 26 when the movable partition 102 is in the first position (FIG. 3), and the other panel 132" is coupled to the frame 130 so as to be adjacent to the cargo area 22 when the movable partition is in the second position (FIG. 10). The panels 132 may also include at least one cut-out 136, which surrounds the at least one cut-out 134 of the frame 130. One or more portions of the panels 132 may also be covered with a polymeric material, a fabric material, a padding, etc. to create an aesthetically appeasing appearance that corresponds with the driver's seat 26, for example. In this example, the panel 132' includes the handle 116, the occupant restraint system 118, the first pivot bores 120 and the second pivot bore 122, and the panel 132" is substantially planar. The panel 132' also includes a portion of the latch system 114. It should be noted that the panel 132' may be formed in multiple pieces to enable the assembly of the occupant restraint system 118, for example, to the panel 132'. The multiple pieces may be assembled and coupled together via mechanical fasteners, ultrasonic welding, adhesives, etc. to form a uniform panel 132'.

The one or more rollers 112 are coupled to the frame 130. In other embodiments, the rollers 112 may be coupled to the panels 132. In this example, the rollers 112 are coupled to the frame 130 via a mounting bracket coupled to the frame 130; however, it will be understood that various techniques exist for coupling one or more rollers to the bulkhead body 110. For example, the rollers 112 may each comprise an annular body that is rotatably mounted on a pin coupled to the frame 130, etc. In this example, the bulkhead body 110 includes at least one of the rollers 112 at a first end 110' and at least one of the rollers 112 at an opposite, second end 110". It should be noted that the bulkhead body 110 may include more or less rollers 112 depending upon the width of the bulkhead body 110. Moreover, the bulkhead body 110 need not include rollers 112, if desired.

The rollers 112 engage with a pair of tracks 140 coupled to the body 14 of the vehicle 10. In one example, one of the tracks 140 is coupled to a first surface 142 of the cabin 10', and the other of the tracks 140 is coupled to an opposite, second surface 144. In this example, the first surface 142 is a ceiling or roof of the vehicle 10, and the second surface 144 is a floor of the vehicle 10. It should be noted that the one or more tracks 140 may be recessed within the first surface 142 and/or the second surface 144 so as to be flush with the respective first surface 142 and/or the second surface 144. The tracks 140 are each substantially U-shaped to receive the respective rollers 112 to enable the rollers 112 to rotate within the tracks 140. In certain examples, the tracks 140 may also include a lip or flange to retain the respective rollers 112 within the tracks 140. In certain embodiments, the tracks 140 may be recessed relative to the first surface 142 and/or the second surface 144. In addition, it should be noted that while a pair of tracks 140 is shown and described herein, the vehicle 10 may include a single track 140 (on the second surface 144) that movably couples to one of the rollers 112 on the second end 110", while the panels 132', 132" at the first end 110' may include a polymeric extension that is received within a corresponding channel defined in the first surface 142 and rides in the channel defined in the first surface 142 to movably couple the bulkhead body 110 to the vehicle 10, and vice versa.

Figure 3:
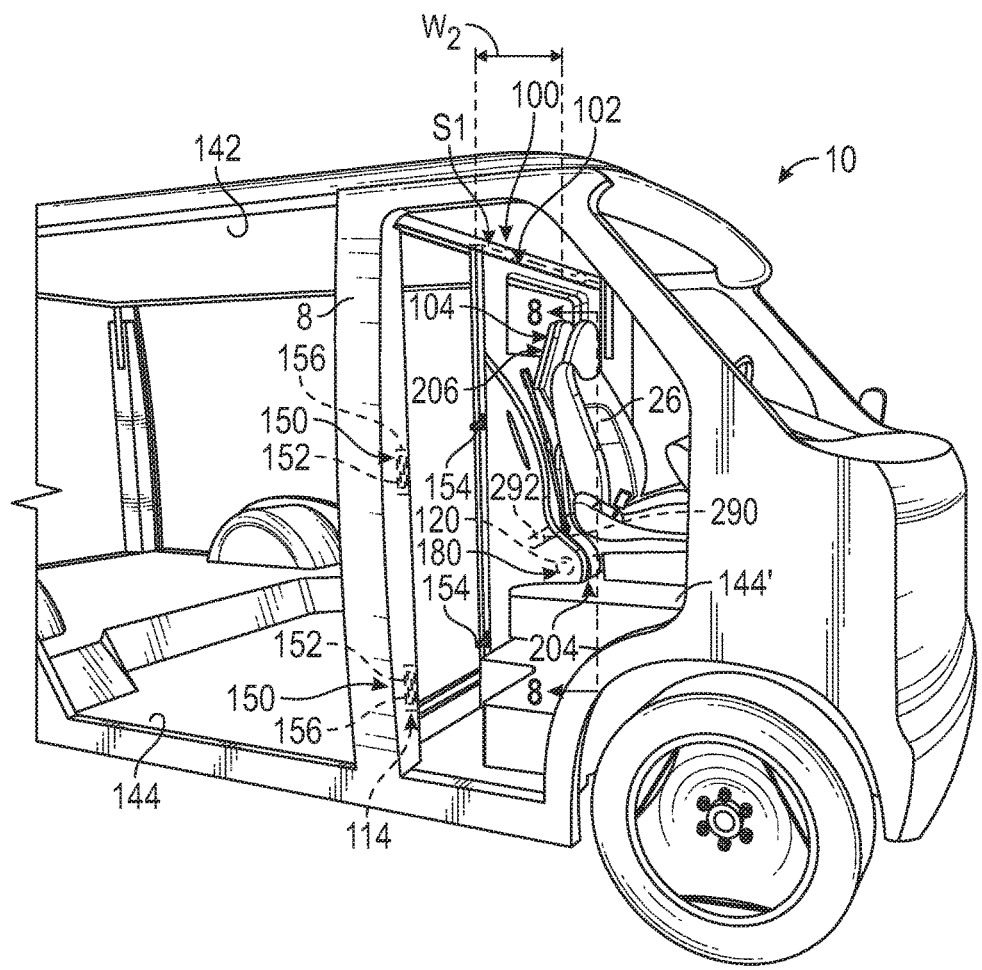
FIG. 3 is a perspective view of the vehicle of FIG. 1, in which the movable partition of the movable partition system is in a first position and the stowable jumpseat is in a first, stowed position.
Figure 4:
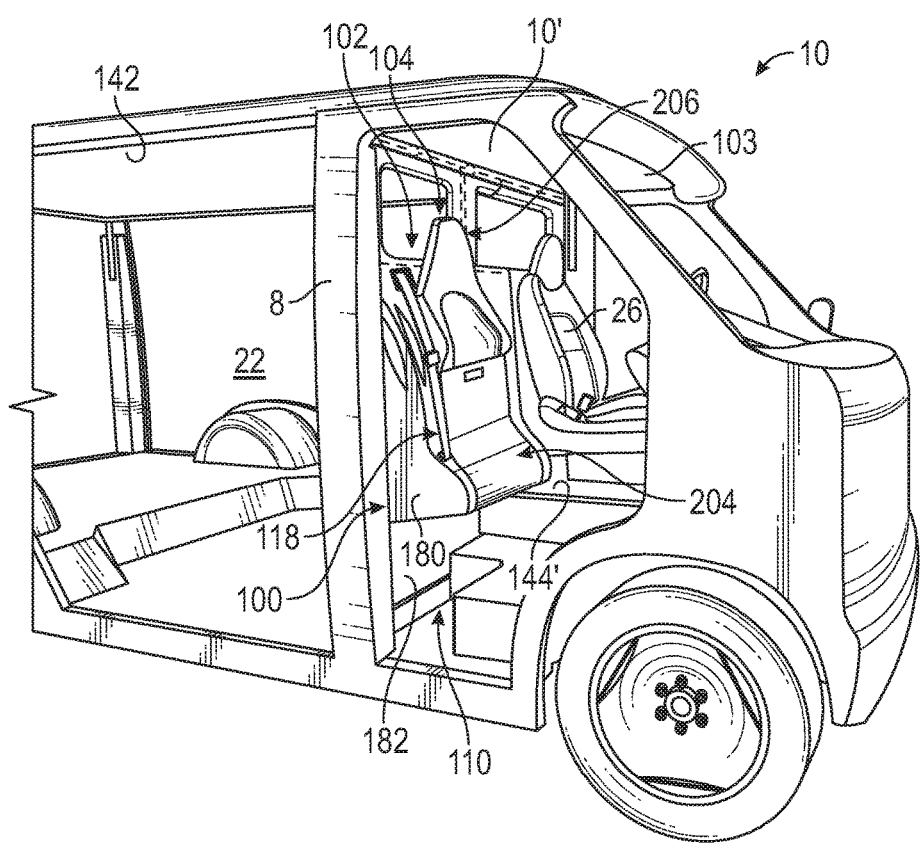
FIG. 4 is a perspective view of the vehicle of FIG. 1, in which the movable partition of the movable partition system is in the second position and the stowable jumpseat is in the first, stowed position.

With reference to FIG. 3, the latch system 114 releasably, but securely, couples the bulkhead body 110 to the body 14 of the vehicle 10. The latch system 114 includes one or more latches 150 and one or more latch sensors 152. In one example, the latches 150 may each comprise automatic-latching pocket door latches, which each include an automatic latch body 154 and a door lock jamb strike 156. The automatic latch body 154 is coupled to the bulkhead body 110, and in one example, is received within a recess defined within the bulkhead body 110. The door lock jamb strike 156 is coupled to the body 14 of the vehicle 10, such as to the B-pillar 8 of the vehicle 10, and automatically couples or latches the bulkhead body 110 to the body 14 of the vehicle 10 when the bulkhead body 110 is moved fully into the second position (FIG. 2). It should be noted that the use of an automatic-latching pocket door latch is merely exemplary, as any suitable latch may be employed to securely couple and retain the movable partition 102 in the second position. Generally, a user's application of force to the handle 116, such as a pulling force, may be sufficient to release the latches 150 to move the bulkhead body 110 from the second position.

In one example, the latch sensors 152 observe conditions associated with the movable partition 102 and generate sensor signals based thereon. In various embodiments, the latch sensors 152 observe whether the bulkhead body 110 is latched such that the automatic latch body 154 is secured or latched to the door lock jamb strike 156, and generate sensor signals based thereon. The latch sensors 152 may be coupled to the door lock jamb strike 156 and/or may be coupled to the B-pillar 8 so as to observe the door lock jamb strike 156. The latch sensors 152 are in communication with the controller 40 over a communication medium that facilitates the transfer of power, commands, etc. (FIG. 1). As will be discussed, the controller 40 receives and processes the sensor signals from the latch sensors 152 and determines whether to enable the jumpseat 104 to be moved from the first, stowed position (FIG. 3) to the second, use position (FIG. 2).

Figure 5:
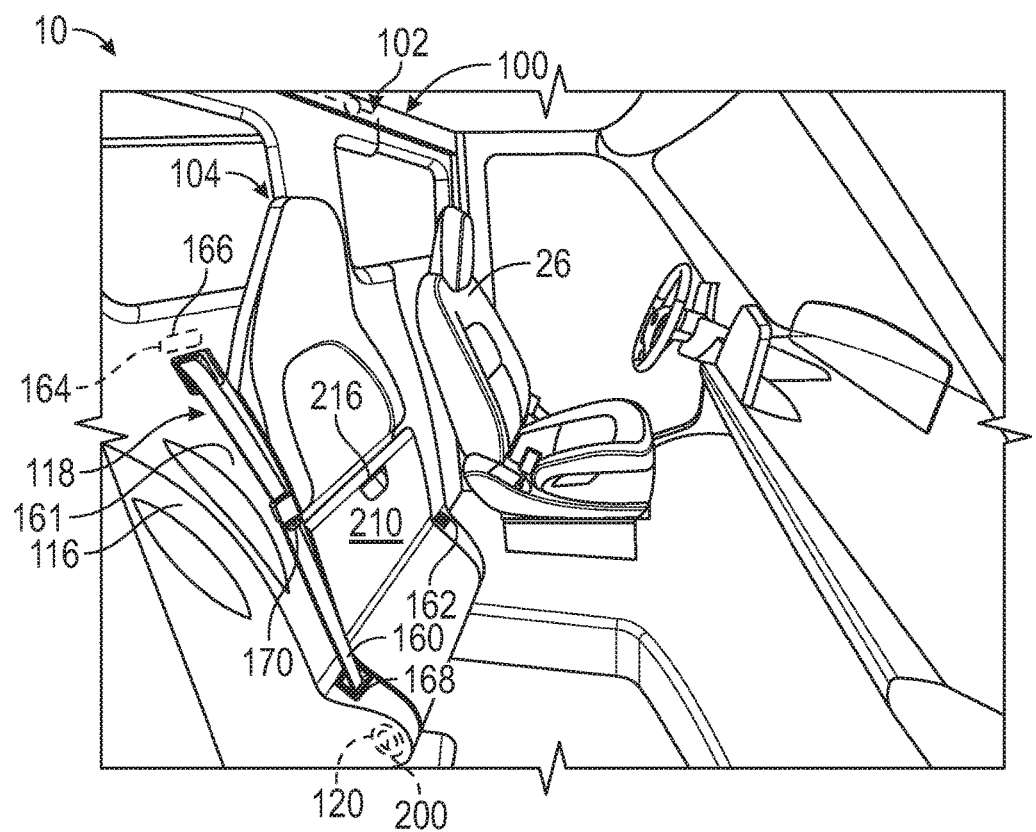
FIG. 5 is a detail perspective view of the movable partition system of FIG. 1, with the movable partition in the second position and the jumpseat in the first, stowed position in accordance with various embodiments.

With reference to FIG. 5, the handle 116 is shown in greater detail. In one example, the handle 116 is integrally formed with the panel 132'. It should be noted that in other embodiments, the handle 116 may be discretely formed and coupled to the panel 132' via one or more mechanical fasteners. In yet other examples, the handle 116 may be coupled to the automatic latch body 154 of one of the latches 150. The handle 116 provides a graspable portion for the operator to assist the operator in moving the bulkhead body 110 between the first positon and the second position.

The occupant restraint system 118 is coupled to the panel 132' of the bulkhead body 110. In this example, the occupant restraint system 118 includes a seat belt 160, a seat belt buckle receptacle 162 and optionally, a seat belt pretensioner 164. The seat belt 160 is coupled to the panel 132', and is movable relative to the panel 132' to engage the seat belt buckle receptacle 162. The seat belt 160 may be coupled to a raised portion 161 of the panel 132', which provides easier access to the seat belt 160 and assists in retaining the occupant within the jumpseat 104. In one example, the seat belt 160 may be coupled to a spool, which enables a selected amount of the seat belt 160 to be moved relative to the panel 132' to engage the seat belt buckle receptacle 162. The seat belt 160 cooperates with the seat belt buckle receptacle 162 to retain an occupant within the jumpseat 104.

The seat belt 160 generally has a first end coupled to the panel 132' at an upper mounting point 166 and a second end coupled to the panel 132' at a lower mounting point 168. The seat belt 160 includes a buckle tongue 170, which is coupled to the seat belt 160 between the first end and the second end. The buckle tongue 170 may be coupled to the seat belt buckle receptacle 162 to secure the occupant to the jumpseat 104. The buckle tongue 170 includes a slot, which couples the seat belt 160 to the seat belt buckle receptacle 162. The seat belt 160 may be composed of a woven polymeric fabric or a webbing, while the buckle tongue 170 may be composed of a metal or metal alloy. It should be noted that while the seat belt 160 is described and illustrated herein as being coupled to the panel 132', the seat belt 160 may also be coupled to the body 14 of the vehicle 10, if desired.

The seat belt buckle receptacle 162 releasably receives the buckle tongue 170. The seat belt buckle receptacle 162 generally includes a biased latch that engages with the slot of the buckle tongue 170 to couple the seat belt 160 to the seat belt buckle receptacle 162. A button of the seat belt buckle receptacle 162 is depressible to overcome the force of the spring, and move the latch to release the buckle tongue 170, thereby uncoupling the seat belt 160 from the seat belt buckle receptacle 162.

The seat belt pretensioner 164 removes slack that may exist on the seat belt 160 based on a determination of an abrupt deceleration of the vehicle 10. In one example, the seat belt pretensioner 164 is coupled to the spool near the upper mounting point 166, and drives the spool to remove the slack from the seat belt 160. By removing the slack in the seat belt 160, the seat belt pretensioner 164 assists in retaining the occupant in the jumpseat 104 during an abrupt deceleration of the vehicle 10.

With reference to FIG. 2, the panel 132' includes a pair of projections 180 that each defines one of the first pivot bores 120. In this example, the projections 180 each extend outwardly from a surface 182 of the panel 132' to define a substantially U-shaped recess for receiving the jumpseat 104. Generally, the projections 180 are defined to extend outwardly from the panel 132' a distance D from the second end 110" of the bulkhead body 110. The distance D is generally selected such that the projections 180 fit over a raised portion 144' of the second surface 144. The first pivot bores 120 are defined so as to be in communication with the recess such that one or more first pivot pins 200 associated with the jumpseat 104 may be received within the respective first pivot bores 120. As will be discussed, the first pivot bores 120 receive the respective first pivot pins 200 of the jumpseat 104 to enable the jumpseat 104 to move between the first, stowed position and the second, use position.

The second pivot bore 122 is defined on the panel 132' so as to be near the first end 110' of the bulkhead body 110. The second pivot bore 122 is spaced apart from the first pivot bores 120, and receives a portion of the jumpseat 104 to enable the jumpseat 104 to move between the first, stowed position and the second, use position. The second pivot bore 122 is substantially C-shaped, and receives at least one second pivot pin 202 to pivotally couple the jumpseat 104 to the panel 132'.

The jumpseat 104 provides a seating surface for an additional occupant of the vehicle 10. As discussed, the jumpseat 104 is movable between the first, stowed position (FIG. 3), and the second, use position (FIG. 2). The jumpseat 104 includes a seat bottom 204, a seat back 206 and a lock system 208. The seat bottom 204 and the seat back 206 are each composed of a polymeric material, which is molded, extruded, etc. The seat bottom 204 and the seat back 206 may each be covered by a cover composed of a suitable fabric, polymer and/or leather material.

Figure 6:
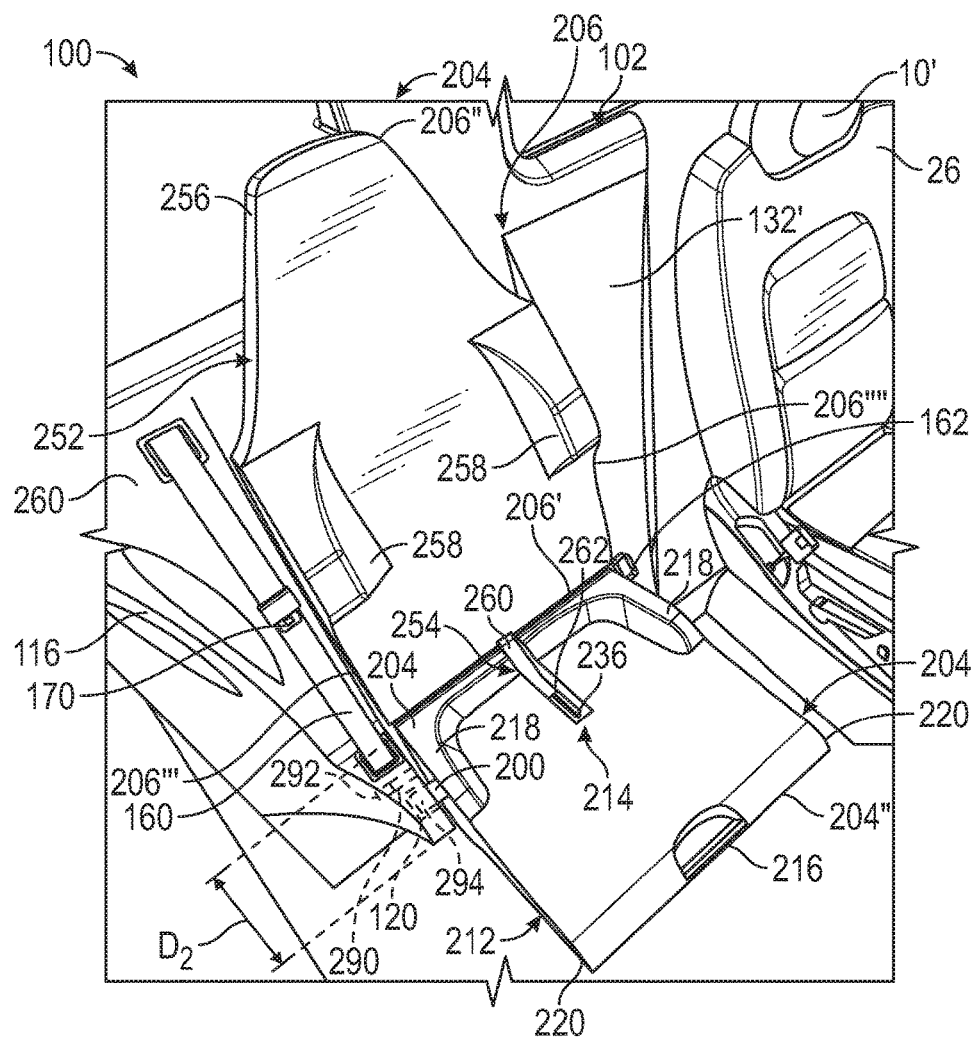
FIG. 6 is a detail view of the jumpseat of the movable partition system, with the jumpseat in the second, use position in accordance with various embodiments.

With reference to FIGS. 5 and 6, the seat bottom 204 includes a first side 210 (FIG. 5), an opposite, second side 212 (FIG. 6), the first pivot pins 200 (FIG. 5), a guide slot 214 (FIG. 6) and a graspable portion or seat handle 216. The seat bottom 204 also receives a portion of the lock system 208 to retain the jumpseat 104 in the first, stowed position, as will be discussed. The first side 210 faces the cabin 10' when the jumpseat 104 is in the first, stowed position. The second side 212 is adjacent to the seat back 206 when the jumpseat 104 is in the first, stowed position, and with reference to FIG. 6, forms a seating surface when the jumpseat 104 is in the second, use position. In one example, the second side 212 includes a pair of side bolsters 218, which assist in retaining the occupant within the jumpseat 104. The side bolsters 218 may be integrally formed with the seat bottom 204, or may be formed separately and coupled to the seat bottom 204. In certain embodiments, the side bolsters 218 may be formed of a foam or other padding, and retained on the seat bottom 204 by the cover. In this example, the side bolsters 218 extend from a first end 204' of the seat bottom 204 for a distance D2. The distance D2 is substantially equal to a distance the projections 180 extend outwardly from the panel 132' such that the projections 180 cooperate with the side bolsters 218 to retain the occupant.

The first pivot pins 200 extend outwardly from sidewalls 220 of the seat bottom 204. The first pivot pins 200 may be integrally formed with the seat bottom 204. In one example, a respective one of the first pivot pins 200 extends outwardly from a respective one of the sidewalls 220. Each of the first pivot pins 200 is substantially cylindrical, and is received within a respective one of the first pivot bores 120 (FIG. 5). The first pivot pins 200 cooperate with the first pivot bores 120 to enable the seat bottom 204 to pivot relative to the panel 132'. It should be noted that the use of the first pivot pins 200 coupled to the seat bottom 204 and the first pivot bores 120 coupled to the projections 180 is merely exemplary, as the projections 180 may include a pivot pin and/or pivot rod, and the seat bottom 204 may include a receptacle, such as a bore, C-shaped recess, etc., which enables pivotal movement between the seat bottom 204 and the bulkhead body 110. Thus, it should be understood that the pivotal arrangement described herein is merely an example.

Figure 7:
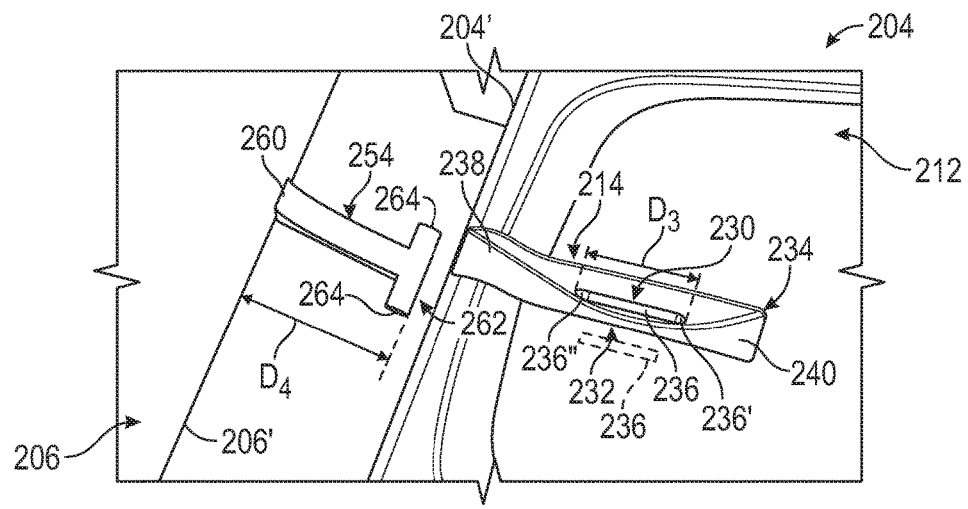
FIG. 7 is an exploded detail view of a portion of the seat bottom and a portion of a seat back of the jumpseat of FIG. 6 in accordance with various embodiments.

The guide slot 214 is defined within the second side 212 of the seat bottom 204, and extends from the first end 204' toward an opposite, second end 204" of the seat bottom 204. The guide slot 214 may be defined during the forming of the seat bottom 204, or may be formed in a post processing step. In one example, the guide slot 214 extends for the distance D2. With reference to FIG. 7, the guide slot 214 is shown in greater detail. As will be discussed, the guide slot 214 cooperates with a portion of the seat back 206 to assist in moving the jumpseat 104 between the first, stowed position and the second, use position. The guide slot 214 is defined as an arcuate recess within the seat bottom 204, and includes a first slot sidewall 230, a second slot sidewall 232 and an arcuate base 234. The first slot sidewall 230 is substantially opposite the second slot sidewall 232 and the base 234 interconnects the first slot sidewall 230 and the second slot sidewall 232. The first slot sidewall 230 and the second slot sidewall 232 each define a channel 236. The channels 236 are opposite each other, and extend for a distance D3. The distance D3 is an amount of travel required to move the seat bottom 204, and thus, the seat back 206, between the first, stowed position and the second, use position. The base 234 is arcuate to provide a path for a follower tab 254 during the movement of the jumpseat 104 between the first, stowed position and the second, use position. In this regard, the base 234 has a first inclined surface 238 and a second inclined surface 240. The first inclined surface 238 provides a path for the remainder of the follower tab 254 during the movement of the second end 262 of the follower tab 254 within the channels 236.

With reference to FIG. 6, the seat handle 216 is defined in the seat bottom 204 adjacent to the second end 204". The seat handle 216 enables the occupant to apply a force to move the jumpseat 104 between the second, use position and the first, stowed position.

Figure 8:
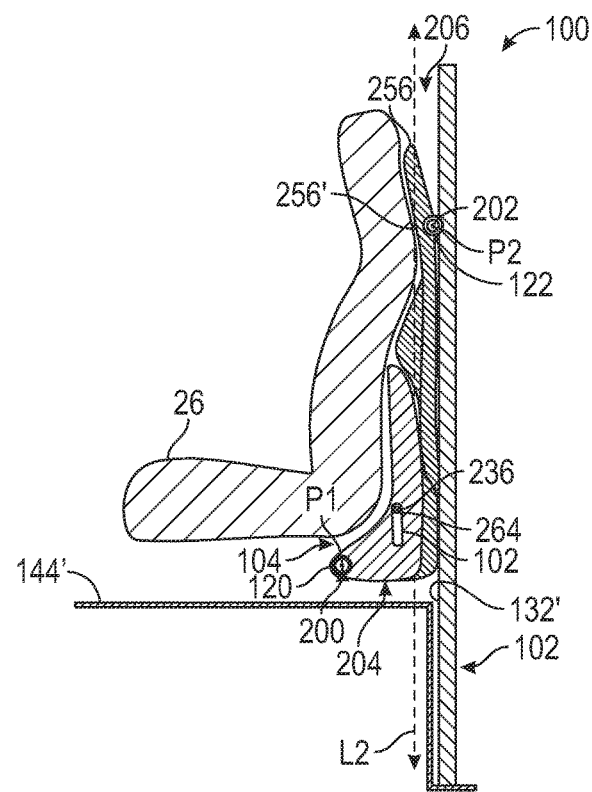
FIG. 8 is a cross-sectional view of the movable partition system taken along line 8-8 of FIG. 3, in which the jumpseat is in the first, stowed position in accordance with various embodiments.

The seat back 206 includes a first back side 250, an opposite, second back side 252 and the follower tab 254. The seat back 206 has a first end 206' and a second end 206". A headrest 256 is defined at the second end 206". The first back side 250 is adjacent and coupled to the panel 132'. The first back side 250 is substantially planar from first end 206' to the headrest 256. The first back side 250 includes the second pivot pin 202. With reference to FIG. 8, the second pivot pin 202 is generally defined at a base 256' of the headrest 256. The second pivot pin 202 is received within the second pivot bore 122 to enable the jumpseat 104 to pivot relative to the panel 132'. Thus, the jumpseat 104 is pivotally coupled to the panel 132' of the bulkhead body 110 at two pivot points (the first pivot pins 200 and the second pivot pin 202). The jumpseat 104 is pivotable about two pivot axes, with a first pivot axis P1 defined along a centerline of the first pivot pins 200 and a second pivot axis P2 defined along a centerline of the second pivot pin 202. The first pivot axis P1 is offset from the second pivot axis P2 along a longitudinal axis L2 of the jumpseat 104. The first pivot axis P1 and the second pivot axis P2 are each substantially perpendicular to the longitudinal axis L2 of the jumpseat 104.

With reference back to FIG. 6, the second back side 252 includes a pair of arm bolsters 258, which assist in retaining the occupant within the jumpseat 104. One of the arm bolsters 258 is defined along a third end 206''' of the seat back 206, and the other of the arm bolsters 258 is defined along a fourth end 206'''' of the seat back 206. The arm bolsters 258 may be integrally formed with the seat back 206, or may be formed separately and coupled to the seat back 206. In certain embodiments, the arm bolsters 258 may be formed of a foam or other padding, and retained on the seat back 206 by the cover. In this example, the arm bolsters 258 extend from the headrest 256 for a distance. The raised portion 161 of the panel 132' cooperates with the arm bolsters 258 to assist in retaining the occupant.

The follower tab 254 extends outwardly from the first end 206' of the seat back 206. The follower tab 254 may be integrally formed with the seat back 206, or may be formed discretely and coupled to the seat back 206 via ultrasonic welding, mechanical fasteners, etc. The follower tab 254 interconnects the seat bottom 204 and the seat back 206. The follower tab 254 has a first end 260 and an opposite, second end 262. The first end 260 is coupled to the first end 206', and the second end 262 is coupled to the guide slot 214. With reference to FIG. 7, the second end 262 has a substantially T-shape, with a pair of posts 264. The posts 264 engage a respective one of the channels 236 defined in the first slot sidewall 230 and the second slot sidewall 232. The T-shape of the second end 262 maintains the coupling of the second end 262 of the follower tab 254 to the guide slot 214. The follower tab 254 extends for a distance D4, which is an amount of travel of the seat bottom 204 necessary to move the jumpseat 104 between the second, use position and the first, stowed position.

The lock system 208 ensures the jumpseat 104 cannot be moved to the second, use position unless the bulkhead body 110 is securely coupled to the B-pillar 8. Stated another way, the lock system 208 inhibits the jumpseat 104 from being moved to the second, use position unless the movable partition 102 is coupled to the body 14 of the vehicle 10 via the latch system 114. Generally, the lock system 208 is responsive to one or more control signals received from the controller 40, for example, to release the lock pin 290 and enable the jumpseat 104 to be moved from the first, stowed position to the second, use position. In one example, the lock system 208 includes the solenoid 292 and the seat position sensor 294, which are each in communication with the controller 40, over a communication medium that facilitates the transfer of data, power, commands, etc. (FIG. 1). The solenoid 292 is coupled to the lock pin 290 and is responsive to one or more control signals to move the lock pin 290 relative to a housing of the solenoid 292. In one example, the solenoid 292 receives the one or more control signals from the controller 40, and based on the one or more control signals, the solenoid 292 retracts the lock pin 290 into the housing of the solenoid 292 to enable the jumpseat 104 to be moved from the first, stowed position. In another example, the solenoid 292 receives the one or more control signals from the controller 40, and based on the one or more control signals, the solenoid 292 extends the lock pin 290 from the housing of the solenoid 292 to retain the jumpseat 104 in the first, stowed position.

Figure 6A:
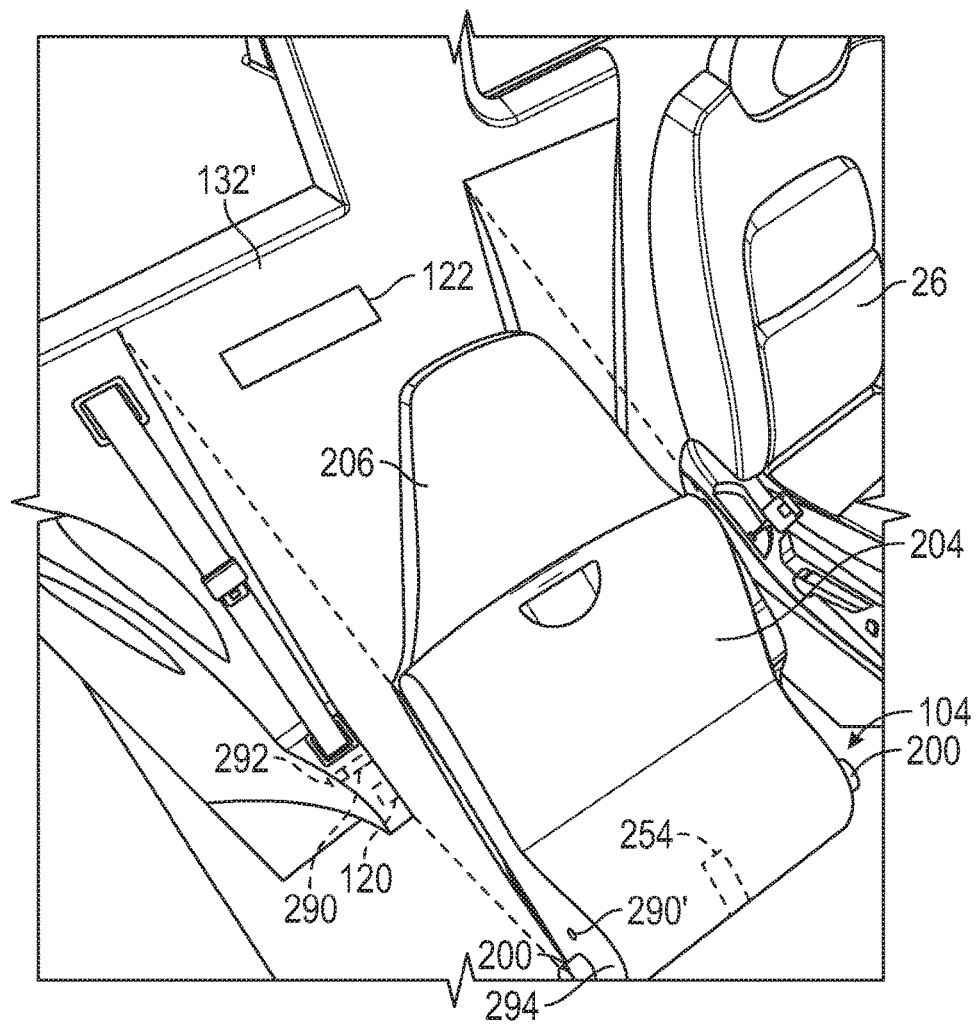
FIG. 6A is a partially exploded view that illustrates the jumpseat in the first, stowed position exploded from the movable partition.

In this example, the solenoid 292 is coupled to one of the projections 180 such that the lock pin 290 protrudes from the one of the projections 180 into a bore 290' (FIG. 6A) the seat bottom 204 and prevents the seat bottom 204 from moving relative to the seat back 206. It should be noted that various other configurations may be employed to inhibit the movement of the jumpseat 104 from the first, stowed position to the second, use position until the bulkhead body 110 is coupled to the B-pillar 8. For example, a mechanical linkage and/or a cable may be employed between the latch system 114 and the seat bottom 204 such that the engagement of the bulkhead body 110 with the B-pillar 8 (i.e. latching of the bulkhead body 110), the lock pin 290 is pulled rearward by the linkage and/or cable. In addition, it should be noted that one or more spring-loaded detent pins may also be used to maintain the jumpseat 104 in the second, use position.

In various embodiments, with reference to FIG. 6, the seat position sensor 294 is coupled to the seat bottom 204 and/or the seat back 206 to observe a condition of the jumpseat 104. The seat position sensor 294 is any sensing device capable of observing a position of the seat bottom 204 and/or seat back 206, including, but not limited to a rotary encoder, etc. In one example, the seat position sensor 294 observes the seat bottom 204 to determine whether the seat bottom 204 is in the first, stowed position. In the example of a rotary encoder, the seat position sensor 294 may be coupled to one of the first pivot pins 200 such that rotation of the one of the first pivot pins 200 within a respective one of the first pivot bores 120 generates a signal, which is communicated to the controller 40. The controller 40 processes the signal and determines a position of the seat bottom 204, and thus, the jumpseat 104. Based on the position of the seat bottom 204 as in the first, stowed position, the controller 40 outputs one or more control signals to the solenoid 292 to extend the lock pin 290 to maintain the jumpseat 104 in the first, stowed position.

In order to assemble the movable partition system 100, with the frame 130 and panels 132', 132' formed, the panels 132', 132" are coupled to the frame 130 to form the bulkhead body 110. The rollers 112 are coupled to the frame 130. The seat belt 160 and the seat belt buckle receptacle 162 are coupled to the panel 132'. In various embodiments, the seat belt 160 and the seat belt buckle receptacle 162 are coupled to a first portion of the panel 132' and a second portion of the panel 132' is coupled to the first portion of the panel 132' to result in a uniform panel 132'. The automatic latch body 154 is coupled to the panel 132'. With the seat bottom 204 and the seat back 206 formed, the second pivot pin 202 of the seat back 206 is coupled to the second pivot bore 122 of the panel 132' to couple the seat back 206 to the bulkhead body 110. The first pivot pins 200 of the seat bottom 204 are coupled to the first pivot bores 120 of the panel 132' and the follower tab 254 is coupled to the seat bottom 204 to couple the seat bottom 204 to the panel 132' and the seat back 206. In one example, the seat position sensor 294 is coupled to one of the first pivot pins 200 to observe a position of the seat bottom 204. The lock pin 290 and the solenoid 292 are coupled to the jumpseat 104 to maintain the jumpseat 104 in the first, stowed position.

The door lock jamb strike 156 is coupled to the B-pillar 8 and the latch sensors 152 are coupled to the B-pillar 8. The latch sensors 152 are communicatively coupled to the controller 40. The tracks 140 are coupled to the first surface 142 and the second surface of the vehicle 10. With the jumpseat 104 coupled to the bulkhead body 110, the movable partition system 100 is installed or coupled to the vehicle 10 by positioning the rollers 112 within the tracks 140. The solenoid 292 and the seat position sensor 294 are each communicatively coupled to the controller 40.

Figure 9:
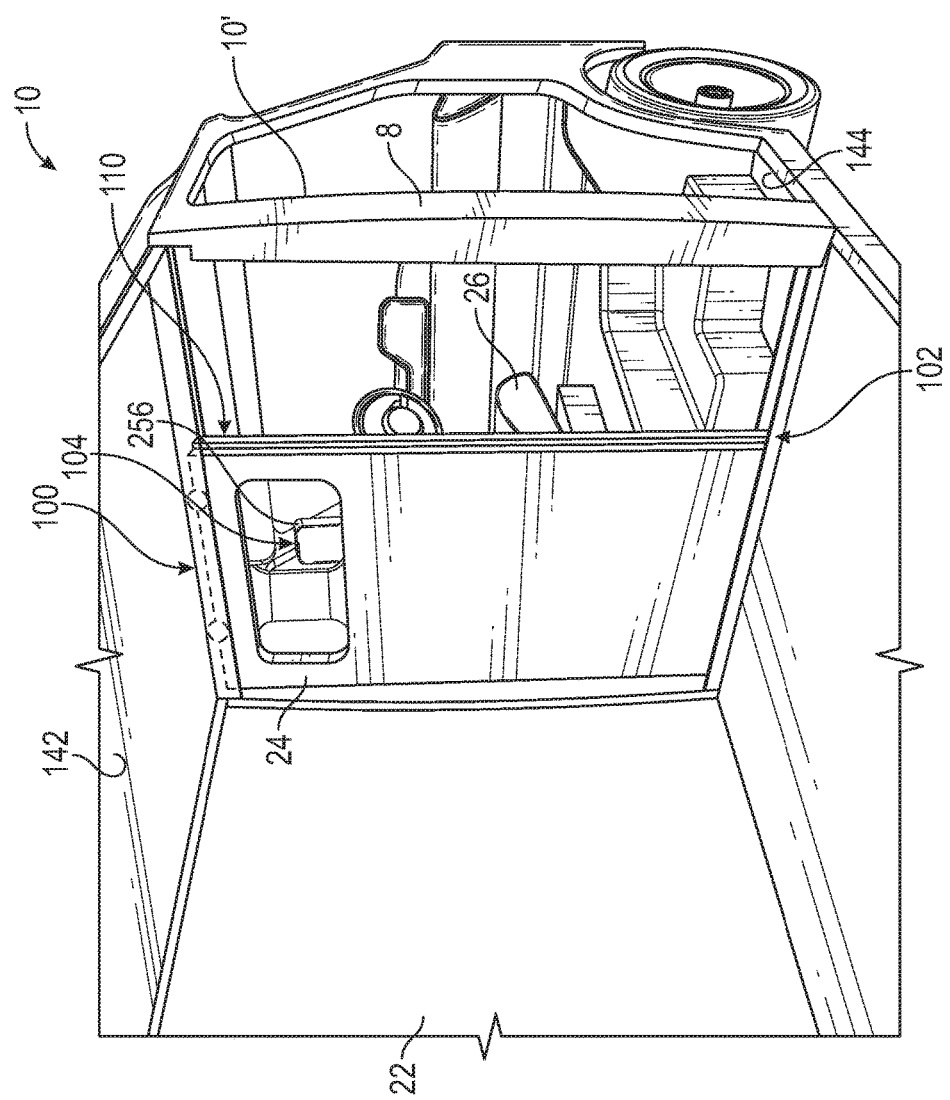
FIG. 9 is a rear perspective view of the vehicle of FIG. 3, which illustrates the access to the cargo area provided by the movable partition of the movable partition system in accordance with various embodiments.

During operation of the vehicle 10, the movable partition 102 is movable via the rollers 112 rolling along the tracks 140 from the second position to the first position in which access is provided to the cargo area 22, as shown in FIG. 9. With reference to FIG. 10, the movable partition 102 is movable via the rollers 112 rolling along the tracks 140 from the first position to the second position in which the cargo area 22 is enclosed. When in the second position, the movable partition 102 may be latched to the B-pillar 8 via the latch system 114, which secures the movable partition 102 during the operation of the vehicle 10. The latch sensors 152 observe whether the movable partition 102 is latched, and generate sensor signals based thereon. The controller 40 receives and processes the sensor signals from the latch sensors 152. The controller 40 determines whether the movable partition 102 is latched. If true, the controller 40 outputs the one or more control signals to the solenoid 292 to retract the lock pin 290.

Figure 12:
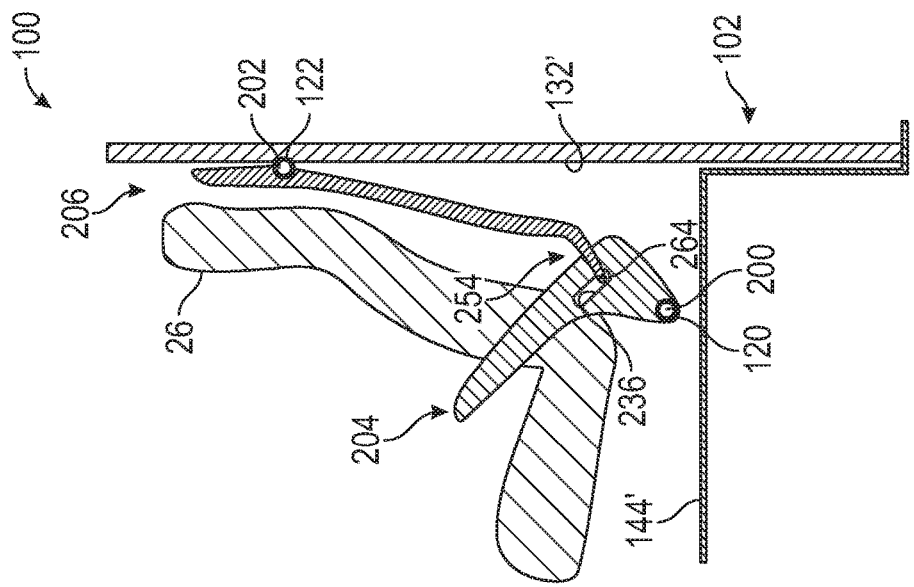
FIG. 12 is a schematic cross-sectional view of the movable partition system taken from the perspective of line 8-8 of FIG. 3, in which the jumpseat has moved further from the first, stowed position toward the second, use position in accordance with various embodiments.
Figure 11:
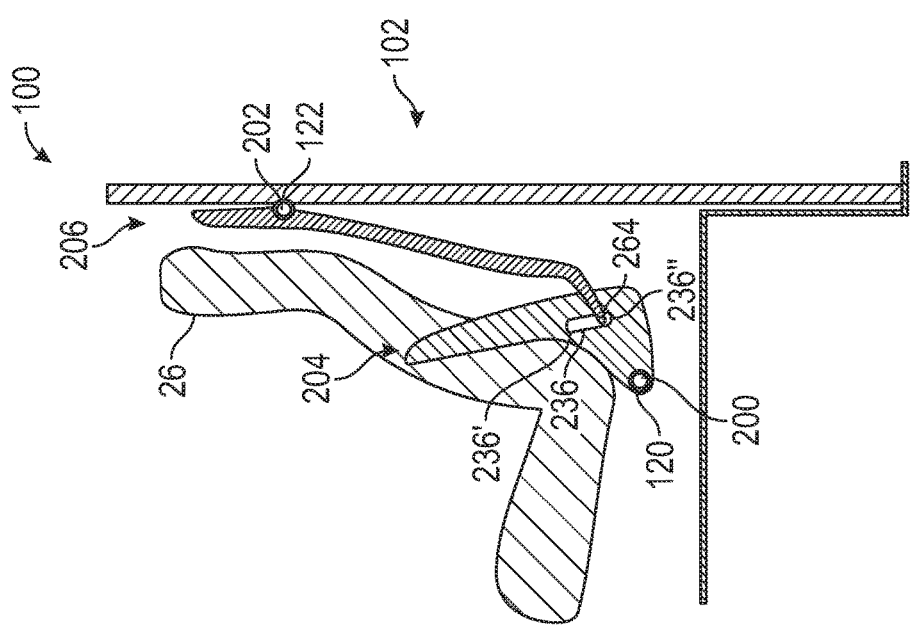
FIG. 11 is a schematic cross-sectional view of the movable partition system taken from the perspective of line 8-8 of FIG. 3, in which the jumpseat has moved from the first, stowed position toward the second, use position in accordance with various embodiments.
Figure 13:
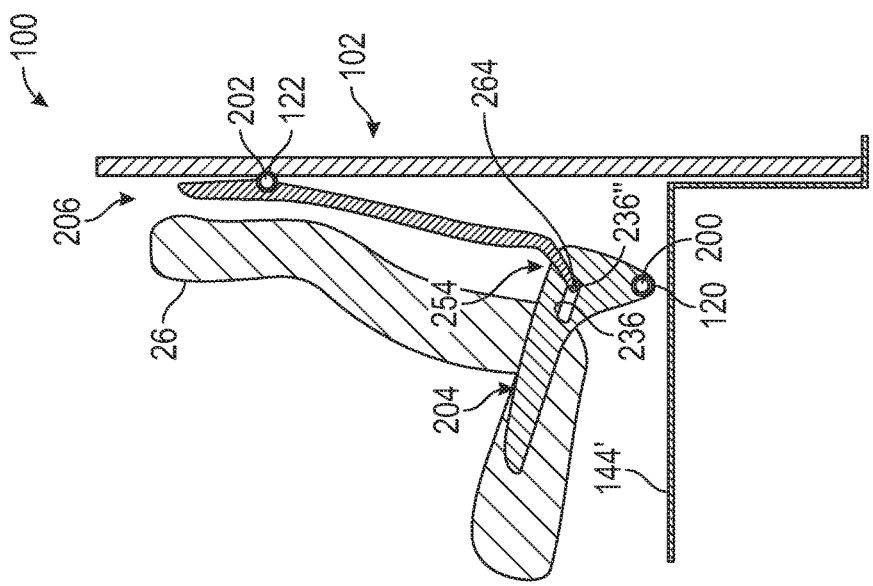
FIG. 13 is a schematic cross-sectional view of the movable partition system taken from the perspective of line 8-8 of FIG. 3, in which the jumpseat has moved even further from the first, stowed position toward the second, use position and the seat back of the jumpseat has pivoted relative to the movable partition in accordance with various embodiments.
Figure 14:
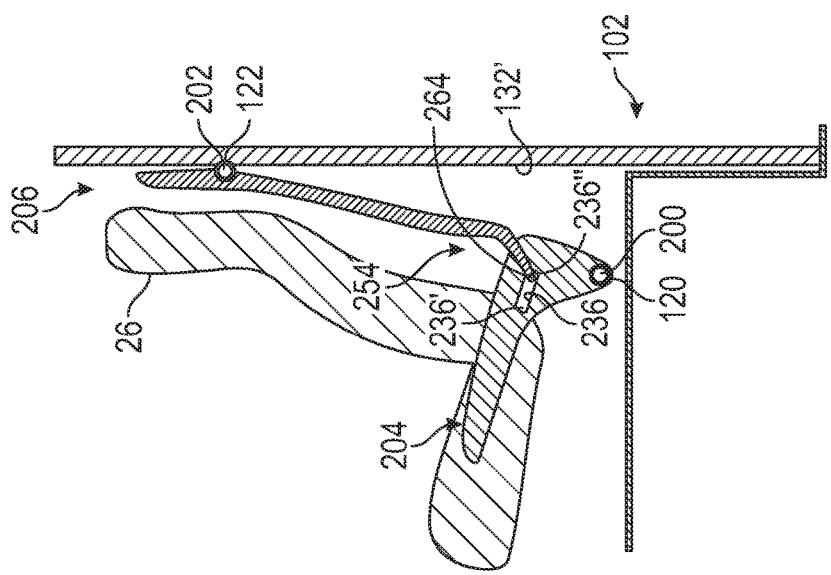
FIG. 14 is a schematic cross-sectional view of the movable partition system taken from the perspective of line 8-8 of FIG. 3, in which the jumpseat is the second, use position in accordance with various embodiments.

Upon receipt of the one or more control signals by the solenoid 292, the solenoid 292 retracts the lock pin 290. With the lock pin 290 retracted, the occupant may pull on the seat handle 216 and move the jumpseat 104 from the first, stowed position to the second, use position. With reference to FIG. 8, the application of a downward force to the seat handle 216 pivots the seat bottom 204 within the first pivot bores 120. As the seat bottom 204 pivots, the follower tab 254 moves from a first end 236' of the channels 236 toward a second end 236" of the channels 236, as shown in FIG. 11. With reference to FIG. 12, the continued application of the downward force and the force of gravity, the first pivot pins 200 of the seat bottom 204 continue to pivot about the first pivot bores 120, which cause the follower tab 254 to advance toward the second end 236" of the channels 236. With reference to FIG. 13, as the seat bottom 204 continues to pivot about the first pivot bores 120, the follower tab 254 approaches the second end 236" of the channels 236. As the follower tab 254 approaches the second end 236", the first end 260 of the follower tab 254 pulls on the seat back 206, causing the second pivot pin 202 of the seat back 206 to pivot within the second pivot bore 122. With reference to FIG. 14, with the seat back 206 pivoted about the second pivot bore 122 the jumpseat 104 is in the second, use position.

In order to move the jumpseat 104 from the second, use position to the first, stowed position, with reference to FIG. 6, the occupant applies an upward force to the seat handle 216 to pivot the seat bottom 204 about the first pivot bores 120 toward the seat back 206. As the seat bottom 204 pivots toward the seat back 206, the follower tab 254 moves from the second end 236" of the channels 236 toward the first end 236'. The movement of the follower tab 254 toward the first end 236' pivots the seat back 206 about the second pivot bore 122. Once the seat bottom 204 is pivoted within the first pivot bores 120 so as to be positioned against the seat back 206, the seat back 206 is pivoted about the second pivot bore 122 and the jumpseat 104 is in the first, stowed position (FIG. 8). The seat position sensor 294 observes the position of the seat bottom 204 and generates sensor signals based thereon. The controller 40 processes the sensor signals and determines whether the seat bottom 204 is in the first, stowed position. If true, the controller 40 generates and outputs the one or more control signals to the solenoid 292 to extend the lock pin 290 to retain the jumpseat 104 in the first, stowed position.

Thus, the movable partition system 100 provides both easy access to the cargo area 22 and also provides an additional seating surface for an occupant. The latch system 114 ensures that the movable partition 102 is secured when in the second position during the operation of the vehicle 10, and the lock system 208 ensures that the jumpseat 104 is positionable within the second, use position only when the movable partition 102 is secured. Further, by providing the jumpseat 104 that is movable between the first, stowed position and the second, use position, the jumpseat 104 is not in the operator's way when not in use.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A movable partition system for a vehicle, comprising:
a body configured to be movably coupled to a cabin of the vehicle, the body movable between at least a first position and a second position; and
a jumpseat coupled to the body so as to be pivotal about a first pivot axis and a second pivot axis, the jumpseat pivotable about the first pivot axis and the second pivot axis to move between a first, stowed position and a second, use position, the first pivot axis offset from the second pivot axis along a longitudinal axis of the jumpseat,
wherein the body includes a latch body and the vehicle includes a jamb strike that receives the latch body to secure the body to the vehicle in the second position.

2. The movable partition system of claim 1, wherein the jumpseat includes a seat bottom and a seat back, and the first pivot axis is defined by at least one pivot pin coupled to the seat bottom.

3. The movable partition system of claim 2, wherein the second pivot axis is defined by at least one pivot pin coupled to the seat back.

4. The movable partition system of claim 2, wherein the seat bottom includes a guide slot, and the seat back includes a follower tab received within the guide slot to pivot the seat back as the seat bottom moves along the first pivot axis.

5. The movable partition system of claim 2, wherein at least one of the seat bottom and the seat back include at least one bolster.

6. The movable partition system of claim 1, wherein the body includes an occupant restraint system coupled to the body adjacent to the jumpseat.

7. The movable partition system of claim 1, wherein the jumpseat further comprises a lock system having a lock pin that retains the jumpseat in the first, stowed position and the movable partition system further comprises a source of data that indicates whether the body is secured to the vehicle in the second position, and a controller that processes the data, determines that the body is secured to the vehicle in the second position and outputs one or more control signals to the lock system to release the lock pin based on the determination.

8. A movable partition system for a vehicle, comprising:
a body configured to be movably coupled to a cabin of the vehicle, the body movable between at least a first position and a second position; and
a jumpseat coupled to the body so as to be pivotal about a first pivot axis and a second pivot axis, the jumpseat having a seat bottom interconnected to a seat back, with the first pivot axis defined by at least one pivot pin coupled to the seat bottom and the second pivot axis is defined by at least one pivot pin coupled to the seat back, and the jumpseat is pivotable about the first pivot axis and the second pivot axis to move between a first, stowed position and a second, use position, the first pivot axis offset from the second pivot axis along a longitudinal axis of the jumpseat,
wherein the seat bottom includes a guide slot, and the seat back includes a follower tab received within the guide slot to pivot the seat back as the seat bottom moves along the first pivot axis.

9. The movable partition system of claim 8, wherein at least one of the seat bottom and the seat back include at least one bolster.

10. The movable partition system of claim 8, wherein the body includes an occupant restraint system coupled to the body adjacent to the jumpseat.

11. The movable partition system of claim 8, wherein the body includes a latch body and the vehicle includes a jamb strike that receives the latch body to secure the body to the vehicle in the second position.

12. The movable partition system of claim 11, wherein the jumpseat further comprises a lock system having a lock pin that retains the jumpseat in the first, stowed position and the movable partition system further comprises a source of data that indicates whether the body is secured to the vehicle in the second position, and a controller that processes the data, determines that the body is secured to the vehicle in the second position and outputs one or more control signals to the lock system to release the lock pin based on the determination.

13. A vehicle, comprising:
a first partition fixedly coupled to a cabin of the vehicle;
a first occupant seat disposed in front of the first partition such that a space is defined between the first occupant seat and the first partition;
a second partition movably coupled to the cabin of the vehicle having a body movable between at least a first position and a second position; and
a jumpseat coupled to the body so as to be pivotal about a first pivot axis and a second pivot axis, the jumpseat pivotable about the first pivot axis and the second pivot axis to move between a first, stowed position and a second, use position, with the first pivot axis offset from the second pivot axis along a longitudinal axis of the jumpseat and in the first, stowed position, the second partition and the jumpseat are positionable within the space.

14. The vehicle of claim 13, wherein the jumpseat includes a seat bottom and a seat back, and the first pivot axis is defined by at least one pivot pin coupled to the seat bottom.

15. The vehicle of claim 14, wherein the second pivot axis is defined by at least one pivot pin coupled to the seat back.

16. The vehicle of claim 14, wherein the seat bottom includes a guide slot, and the seat back includes a follower tab received within the guide slot to pivot the seat back as the seat bottom moves along the first pivot axis.

17. The vehicle of claim 13, wherein the body includes a latch body and the vehicle includes a jamb strike that receives the latch body to secure the body to the vehicle in the second position.

18. The vehicle of claim 17, wherein the jumpseat further comprises a lock system having a lock pin that retains the jumpseat in the first, stowed position and the vehicle further comprises a source of data that indicates whether the body is secured to the vehicle in the second position, and a controller that processes the data, determines that the body is secured to the vehicle in the second position and outputs one or more control signals to the lock system to release the lock pin based on the determination.

\* \* \* \* \*